United States Patent Office 3,751,528
Patented Aug. 7, 1973

3,751,528
TRICYCLIC SECONDARY PHOSPHITE ESTERS
Yoshiaki Inamoto and Hirokazu Nakayama, Wkayama, and Takeji Kadono, Kainan, Japan, assignors to Kao Soap Co., Ltd., Tokyo, Japan
No Drawing. Filed June 23, 1971, Ser. No. 156,115
Claims priority, application Japan, June 24, 1970, 45/54,980
Int. Cl. C07f 9/08
U.S. Cl. 260—956                                   1 Claim

ABSTRACT OF THE DISCLOSURE

A compound of the formula

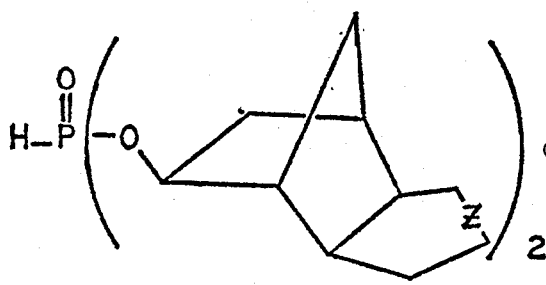

wherein Z is a single or double bond, is prepared by reacting, in an inert solvent, a compound selected from the group consisting of 2 - exo-hydroxy-exo-trimethylenenorbornane and 2 - exo-hydroxy-2,3-dihydro-exo-dicyclopentadiene with phosphorus trihalide. The compounds are useful as additives for synthetic lubricating oils, hydraulic oils and cutting oils.

BACKGROUND OF THE INVENTION

Field of the invention

This invention relates to a process for preparing secondary phosphite esters containing tricyclic aliphatic hydrocarbon residues. More particularly, the present invention relates to a process for preparing the secondary phosphite esters of the alcohols derived from partially or totally hydrogenated exo-dicyclopentadiene, which esters have the Formula I,

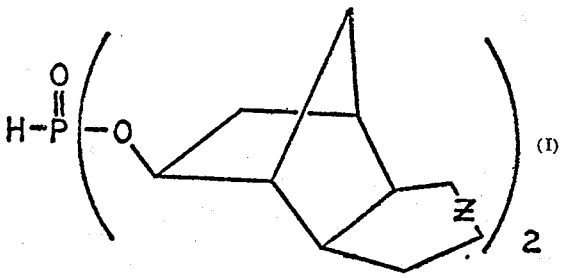

wherein Z represents a single or double bond.

DETAILED DESCRIPTION

The alcohols corresponding to the tricyclic alkyl residues in the Compound I, namely, 2-exo-hydroxy-exo-trimethylenenorbornane (Z corresponds to a single bond) and 2-exo-hydroxy-2,3-dihydro-exo-dicyclopentadiene (Z corresponds to a double bond) have been synthesized already (H. A. Bruson and T. W. Riener, J. Am. Chem. Soc. 67, 723 (1945)), but the phosphite esters thereof are new compounds which are hitherto unknown.

The method of the present invention provides a process for preparing these new secondary phosphite esters (I).

These compounds are very useful substances as additives for synthetic lubricating oil, hydraulic oil, cutting oil and the like in view of the fact that these compounds afford oils with better viscosity index, friction coefficient, antioxidant property and other advantages properties as compared with those containing the known conventional additives.

The method of the present invention is characterized by the reaction of the alcohol corresponding to the desired secondary phosphite ester with phosphorus trihalide ($PX_3$, where X represents a halogen atom), and the chemical reaction involved can be expressed by the following Equation 1:

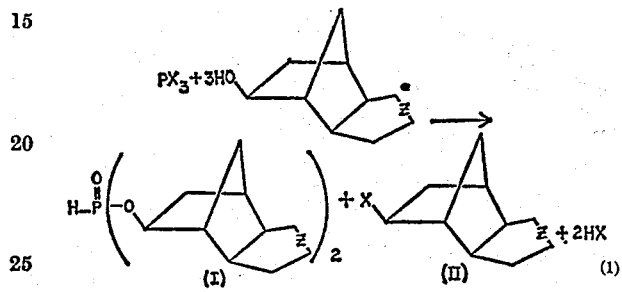

In order to accomplish the reaction of the present invention, 3 moles of the alcohol per one mole of phosphorus trihalide is necessary and sufficient, although an excess of the alcohol is not harmful to the reaction.

The reaction temperature is between —5° C. and +20° C., preferably 0° to 10° C. At temperatures below —5° C., a long reaction time is required, whereas at temperatures above +20° C., the yield of the desired product (I) is decreased because of the side reactions as indicated by the following equations:

where R represents the group,

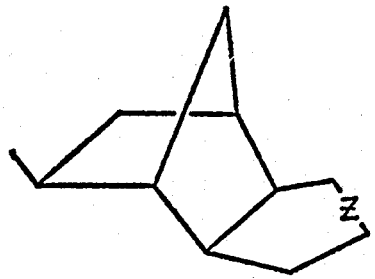

$PX_3 + HO—R \rightarrow X_2POH + X—R$ $X_2POH + HO—R \rightarrow XP(OH)_2 + X—R$ $XP(OH)_2 + HO—R \rightarrow H\overset{O}{\underset{\|}{P}}(OH)_2 + X—R$ It is preferable to use an inert solvent in the present method because the reaction is highly exothermic, whereas the starting alcohols as well as the products are either very viscous liquids or solids at the reaction temperature, thus rendering the reaction mixtures very difficult to stir in order to dissipate the heat of reaction. Typical examples of inert solvents are hydrocarbons such as n-pentane, n-hexane, n-heptane, petroleum ether, ligroin, cyclohexane, benzene and toluene, halogenated hydrocarbons such as methylene chloride, chloroform, carbon tetrachloride, 1,2-dichloroethane and 1,1,2-trichloroethylene, and ethers such as ethyl ether, tetrahydrofuran and dioxan.

Phosphorus trihalide can be added dropwise to the reaction mixture, and is used with or without dilution with the inert solvent. Removal of the hydrogen halide produced is accomplished most conveniently by passing an inert gas, such as nitrogen, through the reaction mixture. The product (I) is isolated as the high boiling residual oil after removal of the solvent and halogenated by-product (II) by distillation.

The present invention is further illustrated by the following examples wherein the term "parts" refers to parts by weight unless otherwise noted.

EXAMPLE 1

Preparation of bis(exo-trimethylenenorbornyl-(2)-exo) hydrogen phosphite (I, Z=single bond)

To a solution of 137 parts of 2-exo-hydroxy-exo trimethylenenorbornane in 200 parts by volume of carbon tetrachloride kept between 0° and 10° C. was added dropwise with stirring 41.2 parts of phosphorus trichloride over a period of 1 hour, while nitrogen gas was passed through the reaction mixture. After the addition of phosphorus trichloride had been completed, stirring and passage of nitrogen were continued for an additional 2 hours and subsequently gaseous ammonia was introduced until no more ammonia was absorbed (the exhaust gas exhibited an alkaline reaction). After removal of the precipitated ammonium chloride by filtration, carbon tetrachloride solvent was distilled off at atmospheric pressure and then the remaining oil was distilled under reduced pressure at a bath temperature below 170° C. to remove any low boiling fractions. Viscous, pale yellow bis(exo-trimethylenenorbornyl-(2)-exo) hydrogen phosphite (yield 104.2 parts, 99%) was obtained as the distillation residue. $n_D^{20}$ 1.518.

*Analysis.*— Found (percent): C, 68.6; H, 9.1; P, 8.2; Cl, 0.36. Calculated for $C_{20}H_{31}O_3P$ (percent): C, 68.55; H, 8.92; P, 8.84; Cl, 0.00.

IR spectrum (liquid film, cm.$^{-1}$)
2970 (s), 2930 (shoulder), 2880 (m): $\nu_{C-H}$ (CH$_2$, CH)
2440 (m): $\nu_{P-H}$ (O=P—H)
1480 (m), 1450 (m), 1370 (m): $\delta_{C-H}$ (CH$_2$, CH)
1265 (S): $\nu_{P=O}$

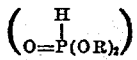

980 (vs): $\nu_{C-O-P}$

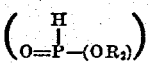

NMR spectrum (t, CCl$_4$ solution, TMS as internal standard, $\tau$)
3.11 (S, 1H): P—H
5.45–5.90 (undissolved resonance, 2H):

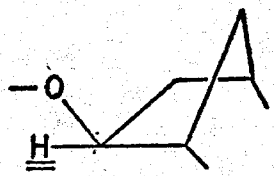

7.50–9.40 (complex m, 28H): Other ring protons. The fine structure of this multiplet closely resembles that of the corresponding multiplet of the starting alcohol, implying the presence of the exo-trimethylenenorbornane ring.

EXAMPLE 2

Preparation of bis(2,3-dihydro - exo - dicyclopentadienyl-(2)-exo) hydrogen phosphite (I, Z=double bond)

To a solution of 180.3 parts of 2-exo-hydroxy-2,3-dihydro-exo-dicyclopentadiene in 200 parts by volume of tetrahydrofuran kept at 0–10° C. was added dropwise with stirring 54.9 parts of phosphorus trichoride over a period of 1 hour while nitrogen was passed through the reaction mixture. Bubbling of nitrogen was continued for a further period of 2 hours at the same temperature and then dry ammonia gas was introduced until absorption ceased. The resulting ammonium chloride precipitates were filtered off and washed with tetrahydrofuran. Evaporation on a water bath under ordinary pressure to remove tetrahydrofuran and subsequent vacuum distillation (at 0.5 mm. Hg, bath temperature below 170° C.) to remove any low boiling fractions afforded as the distillation residue 114.5 parts (yield 83%) of bis(2,3-dihydro-exo-dicyclopentadienyl-(2)-exo) hydrogen phosphite in the form of viscous, pale brown oil. $n_D^{20}$ 1.5298.

Iodine value: Found, 152.6; calculated, 146.5.

*Analysis.*—Found (percent): C, 68.1; H, 7.7; O, 14.6; P, 8.2. Calculated for $C_{20}H_{27}O_3P$ (percent): C, 69.36; H, 7.88; O, 13.86; P, 8.9%.

RH spectrum (liquid film, cm.$^{-1}$)
3060 (m): $\nu_{C-H}$, C=C—H
2950 (s), 2890 (shoulder), 2850 (m): $\nu_{C-H}$, CH$_2$
2430 (m): $\nu_{P-H}$, H—P=O
1620 (w): $\nu_{C=C}$

1465 (m), 1445 (m), 1535 (m): $\delta_{C-H}$, CH$_2$
1260 (s) $\nu_{P=O}$,

970 (vs): $\nu_{C-O}$, P—O—C
800 (m), 700 (m): $\delta_{C-H}$ (out of plane),

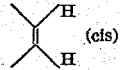

NMR spectrum (t, CCl$_4$ solutions, TMS as internal standard, $\tau$)
4.35
4.57 } (AB-type q, J=5Hz., 4H):

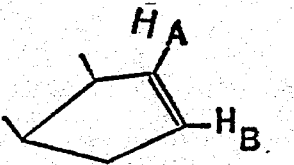

5.35–5.85 (undissolved resonance, 2H):

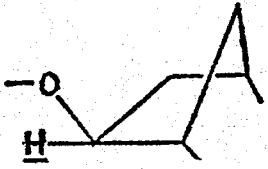

7.10–9.20 (complex m, 24H): Other ring protons. The fine structure of this multiplet closely resembles to that of the corresponding multiplet of the starting alcohol, indicating the presence of the 2,3-dihydro-exo-dicyclopentadiene ring.

The embodiments of the invention in which an exclusive property or privilege is claimed are defined as follows:

1. A compound of the formula

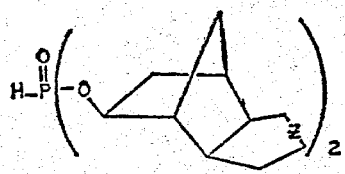

wherein Z represents a single or a double bond.

(References on following page)

References Cited

UNITED STATES PATENTS

| 3,194,827 | 7/1965 | Lutz et al. | 260—976 |
| 3,420,921 | 1/1969 | Sorstokke | 260—976 |

LEWIS GOTTS, Primary Examiner

R. L. RAYMOND, Assistant Examiner

U.S. Cl. X.R.

252—49.8, 648 R, 958, 976